United States Patent [19]
Clark et al.

[11] Patent Number: 5,275,990
[45] Date of Patent: Jan. 4, 1994

[54] PROCESS FOR REGENERATING A SPENT RESID HYDROPROCESSING CATALYST USING A GROUP IIA METAL

[75] Inventors: Frederick T. Clark, Wheaton, Ill.; Albert L. Hensley, Jr., Munster, Ind.

[73] Assignee: Amoco Corporation, Chicago, Ill.

[21] Appl. No.: 955,496

[22] Filed: Oct. 2, 1992

Related U.S. Application Data

[63] Continuation-in-part of Ser. No. 785,452, Oct. 31, 1991, abandoned.

[51] Int. Cl.$^5$ .............. B01J 20/20; B01J 38/34; B01J 38/20; C10G 45/16
[52] U.S. Cl. .................. 502/43; 208/216 R; 208/251 H; 208/254 H; 502/41; 502/49; 502/521
[58] Field of Search ............ 502/25, 38, 41, 306, 502/521, 49, 43; 208/251

[56] References Cited

U.S. PATENT DOCUMENTS

| | | | |
|---|---|---|---|
| 3,846,286 | 11/1974 | Phillipson | 502/306 |
| 4,062,811 | 12/1977 | Hargrove et al. | 502/306 |
| 4,395,329 | 7/1983 | Le Page et al. | 502/306 |
| 4,485,183 | 11/1984 | Miller et al. | 502/25 |
| 4,525,472 | 6/1985 | Morales et al. | 502/306 |
| 4,870,044 | 9/1989 | Kukes et al. | 502/306 |
| 4,975,339 | 12/1990 | Gardner | 502/3 F |

Primary Examiner—Paul E. Konopka
Attorney, Agent, or Firm—Thomas A. Yassen; Richard A. Kretchmer

[57] ABSTRACT

A method is provided for regenerating a molecular sieve-free resid hydroprocessing catalyst for use with an ebullated bed reaction process comprising at least one hydrogenation metal and at least one Group IIA metal deposited on an inorganic oxide support wherein the catalyst contains a pore volume of pores having a diameter greater than 1200 Angstroms of at least 0.05 cc/gm. The method comprises the steps of contacting the molecular sieve-free resid hydroprocessing catalyst with a contaminant metal-containing hydrocarbon feedstream in a first contacting step at conditions sufficient to deposit contaminant metals and coke onto the catalyst; and contacting the coke-deactivated, contaminant metal-containing, molecular sieve-free catalyst with an oxygen-containing gas in a second contacting step at oxidation conditions sufficient to remove a substantial amount of the coke from the coke-deactivated, contaminant metal-containing, molecular sieve-free catalyst. The loss on attrition of the regenerated molecular sieve-free resid hydroprocessing catalyst after the second contacting step is less than 10 weight percent fines per day calculated based on a regeneration temperature of about 900° F.

6 Claims, 2 Drawing Sheets

PROCESS FOR REGENERATING A SPENT RESID HYDROPROCESSING CATALYST USING A GROUP IIA METAL

This application is a CIP of Ser. No. 07/785,452 filed Oct. 31, 1991 and now abandon.

BACKGROUND OF THE INVENTION

The United States and Canada generate about 100,000,000 pounds of spent base-metal catalyst per year, about half of which is spent hydroprocessing catalysts. The present invention relates to a process for regenerating spent, heavy hydrocarbon, hydroprocessing catalysts. More specifically, the present invention relates to a process for regenerating spent, heavy hydrocarbon, hydroprocessing catalysts that have been deactivated with coke and metal deactivants such as nickel and vanadium.

With respect to the present invention, the term hydroprocessing is used to refer to a process for hydrodemetallation, hydrodesulfurization, hydrodenitrogenation, and hydroconversion wherein the term hydroconversion encompasses the hydrocracking and hydrotreating of hydrocarbon streams containing asphaltenes and contaminant metals. Hydroprocessing catalysts used to treat heavy hydrocarbon streams, such as resids, are deactivated as a result of metals and coke deposition. These deposition materials modify the rate of reaction as well as accelerate the rate of catalyst deactivation. The various metal deposits tend to occlude catalyst pores and poison the hydroprocessing catalyst, while coke deposits similarly reduce the pore size and surface area of the hydroprocessing catalyst.

Typically, hydroprocessing catalysts possess substantial macropore volume in order to effect metals removal from heavy hydrocarbon feed streams. Heavy hydrocarbon hydroprocessing catalysts possess the capacity to adsorb contaminant metals, such as nickel and vanadium, in an amount ranging up to about 100 weight percent of the fresh catalyst weight. However, due to the rapid coke deposition rate, the catalyst is deactivated prior to achieving its full metals adsorption capacity. Such catalysts are taken out of service when they contain as little as 10 weight percent nickel plus vanadium.

Thus, the prior art is replete with processes suitable for handling these spent catalysts. These processes can be separated into four areas: (1) disposal, (2) total catalyst reclamation, (3) catalyst rejuvenation, and (4) catalyst regeneration.

Disposal of spent catalyst requires compliance with stringent environmental standards that can substantially increase the cost of handling spent catalyst. One acceptable method of disposal of spent catalyst is encapsulation, wherein the catalyst is surrounded, either as a pellet or in bulk, with an impervious layer of sealant. Bitumen, paraffin wax, and polyethylene have been used as thermoplastic encapsulating agents in which the dry waste is mixed with the sealant at high temperature and cooled. Similar methods have been developed for low temperature encapsulation, where a polybutadiene binder can be mixed with the catalyst followed by application of a thin polyethylene jacket around the mass. Although encapsulation provides a relatively effective means of disposing of spent catalyst, the possibility of fire and weathering can lead to long term instability of the encapsulants. In addition, care must be taken to avoid shear stresses that can break open the encapsulated particles.

Total catalyst reclamation involves removing both the contaminant and catalytic metals from the spent catalyst for recovery as precious metals. The use of catalyst as a source of precious metals is well known in the industry. Most metal recovery methods involve roasting the spent catalyst in the absence or presence of additives, followed by leaching of the catalyst. A suitable method of recovering precious metals from spent catalyst is presented in G. Parkinson, "Recyclers Try New Ways to Process Spent Catalyst," *Chemical Engineering*, Feb. 16, 1987, pp. 25-31. This reference discloses a Gulf Chemical and Metallurgical Corporation metal recovery method wherein molybdenum and vanadium are converted to their sodium salts by adding sodium carbonate during a multiple-hearth roast at 650° to 900° C. The spent catalyst is roasted to remove carbon and sulfur and the calcined material quenched in water to dissolve the salts. A leach liquor is then separated from the insolubles by countercurrent decantation. Ammonium chloride is subsequently added to precipitate ammonium vanadate, which is calcined and fused to produce vanadium pentoxide. The remaining solution is then heated to 80° to 85° C. and acidified to precipitate molybdic acid, which is calcined to molybdic oxide. Other examples of metal recovery techniques are disclosed in Trimm, D. L., "Deactivation, Regeneration, and Disposal of Hydroprocessing Catalysts," *Catalyst in Petroleum Refining* 1989, Elsevier Science Publishers, B.V. Amsterdam (1990).

Catalyst rejuvenation involves selective removal of contaminant metals from the spent catalyst followed by or preceded by oxidative decoking of the coke deposited on the catalyst. The objective in catalyst rejuvenation is to remove the contaminant metals while retaining the catalytic metals on the catalyst for reuse. One way of achieving selective removal of contaminant metals, and in particular vanadium, is by attrition. It is well known that vanadium and iron are deposited on the exterior of some catalysts. As a result, subjecting the outermost layers of the catalyst to abrasion leads to a powder rich in coke, vanadium and iron, while the residual pellet contains catalytic material and nickel (which is deposited throughout the pellet). Although some improvement in activity is observed, the overall benefit is not high because abrasion of the exterior deposits does not generally remove the vanadium that is deposited in the pore mouths of the catalyst. Deeper abrasion to remove pore-mouth deposits can weaken the catalyst. Another approach for selectively removing contaminant metals from the spent catalyst is selective leaching which takes advantage of the fact that metals on the spent catalyst are usually present as sulfides. Selective leaching involves treating the spent hydroprocessing catalyst with a chemical that reacts with only one of these sulfides, e.g. the use of oxalic acid to remove vanadium. An extensive discussion of the use of leaching to selectively remove metals from spent hydroprocessing catalyst can be found in M. Marafi, A. Stanislaus, C. J. Mumford, and M. Fahim, "Regeneration of Spent Hydroprocessing Catalyst: Metal Removal," *Applied Catalysis*, 47(1989) pp. 85-96.

The problem with such selective removal processes is that invariably, some of the catalytic metals are also removed, thereby requiring that at least a portion of the catalytic metals be reincorporated onto the catalyst prior to reuse. The problems associated with selective removal of contaminant metals have lead some operators in the industry to consider catalytic regeneration of the spent catalyst. In other words, decoking the spent, metal-containing hydroprocessing catalyst using oxidative combustion, retaining the contaminant and catalytic metals until the metals build-up is so severe that the catalyst needs to be replaced. Regeneration takes into account that deactivation due to coking generally occurs much more rapidly than deactivation due to metal deposition. In addition, the catalyst's demetallization capacity is more fully utilized, thereby increasing its eventual reclamation value. However, efforts to commercialize the regeneration of resid hydroprocessing catalysts have been largely unsuccessful.

A problem with regeneration by decoking in the presence of contaminant metals, and in particular vanadium, is that the catalyst becomes soft, i.e., the catalyst's resistance to attrition is significantly reduced. This problem is particularly severe when the catalyst is employed in an ebullated bed reaction process where the solid catalyst particles are kept in random motion by the upward flow of liquid and gas. Similarly, equipment commonly used with ebullated bed reaction systems such as the ebullated bed pumps further aggravate catalyst attrition. These physical process factors attendant to resid hydroprocesses combined with the fact that large pore resid hydroprocessing catalysts can be particularly vulnerable to attrition per se, make the attrition resistance of the catalyst critically important.

Moreover, it has now been found that when a spent, contaminant metal-containing, hydroprocessing catalyst is subjected to oxidative combustion, one of the species oxidized is vanadium sulfide, $V_3S_4$, the predominant vanadium phase deposited under typical hydroprocessing conditions. The vanadium sulfide ($V_3S_4$) is then oxidized to vanadium pentoxide ($V_2O_5$), a highly oxidative catalyst, during the combustion step which is highly detrimental to resid hydroprocessing catalyst attrition properties due to at least two separate and distinct reaction mechanisms.

The first detrimental mechanism proceeds from the reaction of the water formed during the oxidation of carbonaceous deposits with the vanadium pentoxide formed by the oxidation of vanadium sulfide to vanadium pentoxide. This reaction forms vanadic acid, $VO(OH)_3$, a volatile and highly reactive species that reacts with metals present in the catalyst such as iron, nickel, aluminum or molybdenum to form mixed metal vanadates. These mixed metal vanadates generally cause loss of both catalyst surface area and attrition resistance.

The second detrimental mechanism occurs since vanadium pentoxide also catalyzes the conversion of sulfur dioxide formed during the combustion reaction to reactive sulfur trioxide, an acidic gas. The sulfur trioxide generally reacts with alumina supports, resulting in loss of both surface area and attrition resistance as taught in U.S. Pat. Nos. 4,089,806 and 4,994,423 respectively.

It is believed that these mechanisms may have discouraged subsequent efforts to regenerate resid hydroprocessing catalysts through combustion techniques.

A number of processes have been suggested to immobilize or passivate the contaminant metals during oxidation to remove coke.

U.S. Pat. No. 4,089,806 discloses a regeneration process wherein a phosphorous component is incorporated onto the catalyst after the partial decoking and extraction step and prior to combusting the remainder of the coke from the catalyst. Incorporation of phosphorous components with the deactivated catalyst is thought to passivate or inhibit the formation of the undesirable vanadates.

U.S. Pat. No. 4,994,423 discloses a regeneration process wherein a Group IIA component is incorporated onto the catalyst after partially decoking the catalyst prior to combusting the remainder of the coke. The Group IIA metal is believed to passivate or inhibit the formation of the undesirable vanadates.

Partial decoking processes, however, are generally costly, complex, and difficult to implement and control. Moreover, it can be difficult to effectively disperse a passivating agent onto the surface of the catalyst when the catalyst is partially covered with coke.

Two-step oxidation has also been the subject of a recent U.S. Patent.

U.S. Pat. No. 4,975,399 discloses a process for regenerating a spent hydrotreating catalyst comprising one or more of molybdenum, nickel, tungsten, and cobalt on an alumina support comprising heating the catalyst at a first temperature ranging from 700° F. to about 1000° F. followed by heating the catalyst at a second temperature ranging from 1100° F. to about 1700° F.

It has been found that the two stage process described above can actually facilitate and increase catalyst attrition. Vanadium sulfide ($V_3S_4$) can and generally decomposes to vanadium pentoxide ($V_2O_5$) at oxidation temperatures above about 700° F. Decomposition of vanadium sulfide to vanadium pentoxide subsequently catalyzes the detrimental attrition effects described above. Moreover, oxidation temperatures above 1400° F. can cause the vanadium pentoxide to melt thereby increasing vanadium pentoxide migration and extending its exposure to and subsequent damage of the alumina support.

Group IIA metals have been used for retaining the crush strength of hydroprocessing catalysts.

U.S. Pat. No. 4,870,044 discloses treating a catalyst with a dissolved magnesium compound. The solute in the impregnating solutions can be any magnesium compound including, but not limited to magnesium nitrate, magnesium carbonate, magnesium sulfate, and the like. Although catalyst crush strength is an important property for use with fixed-bed reaction processes wherein catalyst particles located in the upper sections of the bed exert weight forces on catalyst particles located in the lower sections of the bed, it is less critical in ebullated bed processes where the random motion of catalyst particles caused by the upward flow of liquid and gas virtually eliminate such downward forces. In ebullated bed processes, the critical catalyst attribute is attrition resistance. It is well known that a catalyst that has a high crush strength does not necessarily have a high attrition resistance.

It has now been found that incorporating a Group IIA metal onto a large pore resid hydroprocessing catalyst prior to the deposition of the contaminant metals and coke and subsequent oxidative regeneration provides for superior catalyst attrition properties in the regenerated catalyst. This is believed to occur due to passivation of the contaminant metal by the Group IIA metal whereby conversion of the vanadium to vanadium pentoxide is preempted.

It has also been found that incorporating the Group IIA metal onto the catalyst prior to deposition of the contaminant metals and coke allows for better dispersion of the Group IIA metal onto the catalyst, thereby allowing for uniform deposition of the Group IIA metal onto the surface of the catalyst. The more uniform the deposition of the Group IIA metal, the greater the attrition resistance of the catalyst.

It has similarly been found that utilizing a two-step oxidation process whereby the first oxidation step is maintained at a temperature below 700° F. provides a substantial reduction in conversion of vanadium sulfide to the highly oxidative vanadium pentoxide, thereby providing further improvements in catalyst attrition properties.

It has also been found that maintaining both oxidation steps at temperatures below 1400° F. provides a further improvement in catalyst attrition properties by reducing vanadium pentoxide migration throughout the catalyst support.

It is therefore an object of the present invention to provide a catalyst regeneration method that does not substantially reduce catalyst attrition resistance.

It is another object of the present invention to provide a catalyst regeneration method that avoids costly, complicated, and time-consuming partial decoking and metals or catalyst component incorporation steps on-site.

Other objects appear herein.

SUMMARY OF THE INVENTION

The above objects can be achieved by providing a method for regenerating a molecular sieve-free resid hydroprocessing catalyst for use with an ebullated bed reaction process comprising at least one hydrogenation metal and at least one Group IIA metal deposited on an inorganic oxide support wherein the catalyst contains a pore volume of pores having a diameter greater than 1200 Angstroms of at least 0.05 cc/gm. The method comprises the steps of contacting the molecular sieve-free resid hydroprocessing catalyst with a contaminant metal-containing hydrocarbon feedstream in a first contacting step at conditions sufficient to deposit contaminant metals and coke onto the molecular sieve-free resid hydroprocessing catalyst and contacting the coke-deactivated, contaminant metal-containing, molecular sieve-free catalyst with an oxygen-containing gas in a second contacting step at oxidation conditions sufficient to remove a substantial amount of the coke from the coke-deactivated, contaminant metal-containing, molecular sieve-free catalyst. The loss on attrition of the regenerated molecular sieve-free resid hydroprocessing catalyst after the second contacting step is less than 10 weight percent fines per day calculated based on a regeneration temperature of about 900° F.

The method of the present invention provides superior regeneration performance while not substantially breaking down or destroying the attrition resistance of the resid hydroprocessing catalyst. Regeneration of a resid hydroprocessing catalyst in accordance with the method of the present invention provides a regenerated catalyst having a loss on attrition of below 10 weight percent fines per day, calculated based on a regeneration temperature of about 900° F. Resid hydroprocessing catalysts that are not in accordance with the present invention can often have loss on attrition levels exceeding 10 weight percent fines per day calculated based on a regeneration temperature of about 900° F.

DETAILED DESCRIPTION OF THE PREFERRED EMBODIMENT

Figure 2:
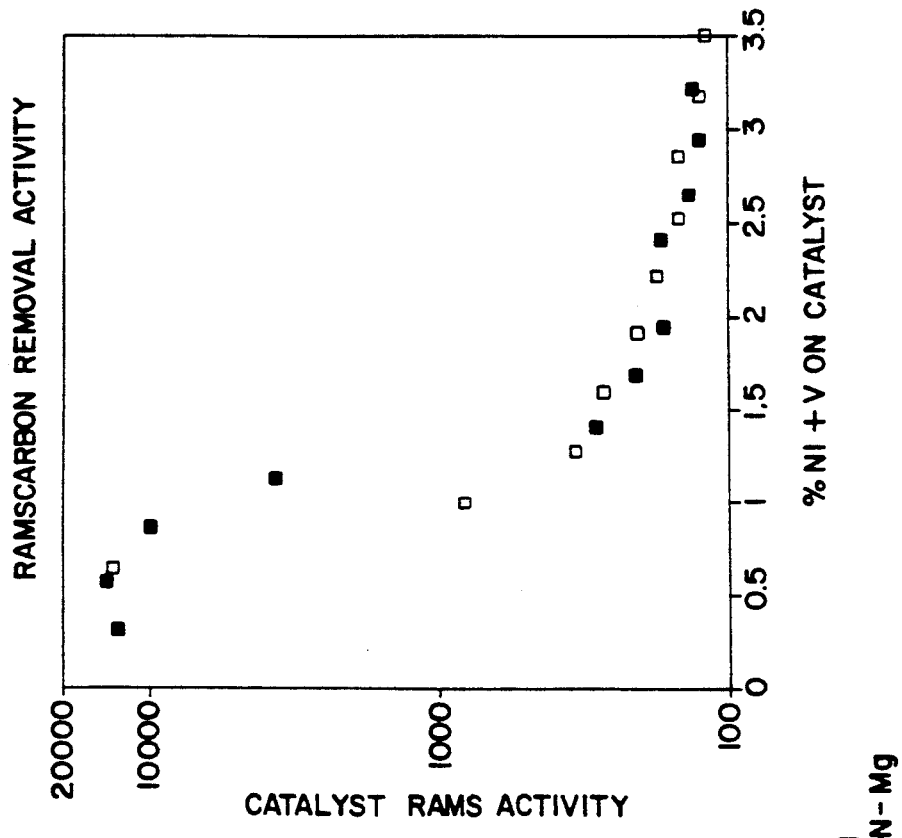
FIG. 2 is a graph illustrating the relationship between ramscarbon removal activity and weight percentage accumulation of nickel plus vanadium for both a nonmagnesium-treated, fresh catalyst and a magnesium-treated fresh catalyst.

The present invention is generally directed to a method for the oxidative regeneration of catalyst used in the hydroprocessing of contaminant metal-containing heavy hydrocarbon feedstreams. The resid hydroprocessing catalyst used with the method of the present invention comprises a molecular sieve-free, inorganic oxide support, one or more hydrogenation metals, and at least one Group IIA metal incorporated onto the catalyst prior to contacting the catalyst with the contaminant metal-containing hydrocarbon feedstream.

Suitable hydrogenation metals for use with the resid hydroprocessing catalyst of the present invention generally comprise the Group VIII and Group VIB metals of the Periodic Table of Elements found in Webster's Seventh New Collegiate Dictionary, G & C Merriam Company, Springfield, Mass., U.S.A. (1965) at page 628. Preferably, the hydrogenation metals comprise at least one metal from each of the Group VIII and Group VIB metals.

The preferred Group VIII metals are cobalt and nickel with cobalt being most preferred. The Group VIII metals are preferably present in an amount ranging from about 0.1 to about 8.0 weight percent and preferably from about 0.4 to about 4.0 weight percent calculated as oxide and based on the total catalyst weight.

The presence of a Group VIII metal with the resid hydroprocessing catalyst utilized with the present invention is particularly useful when ebullated bed reaction systems are employed. In a fixed-bed reaction scheme, the incrementally higher initial hydroprocessing activity provided by Group VIII metals dissipates over time from catalyst coking and metals accumulation. In ebullated bed reaction systems, fresh catalyst is continuously or intermittently added to maintain activity, lower catalyst coke, lower catalyst metals concentrations, and take advantage of the higher initial activity afforded by Group VIII metals.

It has also been discovered that relatively small amounts of a Group VIII metal such as cobalt present in a hydroprocessing catalyst can provide superior hydroprocessing activity in an ebullated bed reaction system. Low cobalt-containing hydroprocessing catalysts are disclosed and claimed in U.S. Pat. No. 4,657,665. The cobalt is generally present in an amount ranging from about 0.4 to about 0.8 wt. % as calculated as an oxide and based on total catalyst weight. The low cobalt-containing catalyst disclosed in this patent also comprises a Group VIB metal present in an amount ranging from about 3.5 to 5.0 wt. % calculated as an oxide and based on the total catalyst weight.

The preferred Group VIB metals are molybdenum and tungsten with molybdenum being most preferred. The Group VIB metals are preferably present in an amount ranging from about 1.0 to about 30.0 weight percent and preferably from about 3.0 to about 20.0 weight percent calculated as oxide and based on the total catalyst weight.

Where both Group VIII and Group VIB hydrogenation metals are utilized, it is preferred that the hydrogenation metals be present in amounts such that the Group VIII oxide to Group VIB oxide weight ratio ranges from about 0.05 to about 0.5 and preferably from about 0.1 to about 0.3 for best results. While the hydrogenation metals described above are measured as the oxide, it is fully intended that the hydrogenation metal components of the catalyst of the present invention can be present as an element, oxide, sulfide, or mixtures thereof.

The hydrogenation metals are generally deposited on a molecular sieve-free, porous, inorganic oxide support. The support can be a naturally occurring or synthetically produced inorganic oxide or a combination of both. Suitable molecular seive-free, porous, inorganic oxide support components can include, but are not limited to, clays, alumina, silica, silica alumina, and aluminum phosphate. The preferred support component is alumina.

The Group IIA metals suitable for use with the present invention generally include beryllium, magnesium, calcium, strontium, barium, and radium. The preferred Group IIA metals are calcium and magnesium with magnesium being most preferred. The resid hydroprocessing catalyst generally comprises from about 0.1 weight percent to about 20.0 weight percent of a Group IIA metal, preferably from about 0.5 weight percent to about 8.0 weight percent, and more preferably from about 0.5 weight percent to about 4.0 weight percent for best results.

The Group IIA metal can be incorporated onto the support by impregnation using aqueous solutions that contain the Group IIA metals as salts, including, but not limited to the nitrates, sulfates, sulfites, acetates, benzoates, halides, carbonates, oxyhalides, hydrochloroxides, oxalates, and thiosulfates. The impregnation solution generally contains a sufficient amount of a Group IIA metal such that the impregnated catalyst contains the desired concentration of Group IIA metal calculated as the oxide and based on the total weight of the fresh catalyst.

The Group IIA metal can be incorporated onto the catalyst before, during, or after addition of hydrogenation metals. It is preferable that the Group IIA metal be incorporated prior to incorporation of the hydrogenation metals in order to minimize interactions of the magnesium salts with the hydrogenation metal salts. However, it is also recognized that commercial catalysts suitable for use in preparing the resid hydroprocessing catalyst of the present invention often are marketed with the hydrogenation metals already incorporated, and it may be more cost effective to prepare the catalyst by incorporation of the Group IIA metal subsequent to hydrogenation metals incorporation.

The hydroprocessing catalyst regenerated in accordance with the method of the present invention is generally prepared by conventional commercial methods for incorporation of hydrogenation metals onto large-pore, high-surface area, inorganic oxide supports or other methods known to those skilled in the art. These methods generally include ion-exchange and impregnation with impregnation methods being preferred.

The resid hydroprocessing catalyst can be prepared by calcining a commercially available porous refractory inorganic oxide such as alumina at a temperature ranging from about 800° F. to about 1,600° F. (426° C. to about 872° C.) for a period of about 0.5 to about 10 hours. The alumina is then generally impregnated with an aqueous solution containing a heat-decomposable compound of the metal to be placed on the catalyst. The catalyst is subsequently dried and calcined. If the impregnation is to be performed with more than one solution, it is understood that the metals may be applied in any order. The drying can be, and is generally conducted in air at a temperature ranging from about 80° F. (27° C.) to about 350° F. (177° C.) for a period of about 0.1 to about 24 hours. The calcination step is generally conducted at a temperature ranging from about 800° F. (426° C.) to about 1,200° F. (648° C.) for a period of from about 0.5 to about 16 hours.

Alternatively, the inorganic oxide support can be prepared by mixing a sol, hydrosol, or hydrogel of the inorganic oxide with a gelling medium, such as ammonium hydroxide. The mixture is stirred to produce a gel and subsequently dried, pelleted or extruded, and calcined. The hydrogenation metal(s) are then generally incorporated onto the support as described above or incorporated during the gelling step.

While the hydroprocessing catalyst regenerated in accordance with the present invention can be present in the form of pellets, spheres, or extrudates, other shapes are also contemplated, such as clover-leaf shape, cross-shape, or C-shape as disclosed in U.S. Pat. Nos. 3,674,680 and 3,764,565 (Hoekstra, et al.).

The finished resid hydroprocessing catalyst used in accordance with the present invention generally has a surface area ranging from about 75 $m^2/g$ to about 400 $m^2/g$ with a total pore volume within the range of about 0.5 cc/g to about 1.5 cc/g. Preferably, the surface area ranges from about 150 $m^2/g$ to about 350 $m^2/g$, with a total pore volume of about 0.6 cc/g to about 1.2 cc/g.

The catalysts most suitably regenerated in accordance with the present invention contain a pore volume of pores having a diameter greater than 1,200 Angstroms of at least 0.05 cc/g, preferably at least 0.1 cc/g, and more preferably from about 0.15 to about 0.3 cc/g for best results. It has been found that catalysts having an insufficient pore volume of pores having a diameter greater than 1,200 Angstroms generally undergo pore mouth blockage from contaminant metals deposition. The blocked pores of such catalysts render those pores essentially ineffective for hydroprocessing. Catalysts having the above-described dimensions and in accordance with the present invention, have substantially improved capability for accumulating metals and provide substantially enhanced resid hydroprocessing performance. However, the higher pore volume of larger diameter pores can increase catalyst attrition which further emphasizes the need for the method of the present invention.

The feedstocks suitable for upgrading in a resid hydroprocessing facility and which generally contact the resid hydroprocessing catalyst in accordance with the present invention generally include, but are not limited to residual boiling components derived from high and low sulfur crudes, decanted oils from FCC processes, lubricating oil extracts produced in lubricating oil solvent extraction processes (lubricating oil extracts), and oils and resins produced in resid solvent extraction processes. The high sulfur crudes from which the high sulfur residual components are derived can have an API gravity as low as 1° API, a sulfur content of up to 8 percent by weight, and substantial amounts of nickel and vanadium.

Residual components derived from a crude distillation unit, such as high and low sulfur vacuum residual components (crude vacuum resid), generally exceeding 800° F. at atmospheric pressure. It is generally expected that a "tail fraction" of lighter hydrocarbon can be included with crude vacuum residual components, however, excessive tail fractions in crude vacuum residual components are generally uneconomic. High sulfur crude vacuum residual components, for purpose of the present invention, generally have a sulfur concentration of at least about 2 percent by weight and typically at least 3 percent by weight. Low sulfur crude vacuum residual components generally have a sulfur concentration of less than 2 percent by weight and typically range from about 0.5 percent by weight to about 1.5 percent by weight. Typical API gravities for crude vacuum resid generally range from about 2° API to about 16° API and typically range from about 6° API to about 10° API.

Residual components suitable for use as a feedstock can also include gas oil boiling, highly aromatic hydrocarbon components such as FCC decanted oil and lubricating oil extracts. Fluid catalytic cracking processes and lubricating oil manufacturing processes generally utilize gas oil boiling feedstocks which comprise hydrocarbon boiling at temperatures ranging from about 600° F. to about 1100° F. at atmospheric pressure. As a result, aromatic bi-products produced from such processes generally boil at temperatures ranging from about 400° F. to about 1100° F. at atmospheric pressure. The solvent extracted resin stream from a resid solvent extraction process is also a suitable feedstock for directing to a resid hydroprocessing facility and can be substituted for or added in addition to FCC decanted oil in a resid hydroprocessing facility.

The resid hydroprocessing processes generally begin with a resid feedstock preheating step wherein waste heat is recovered from downstream process streams to the residual feedstock in a manner so as to reduce preheat furnace heating requirements. The preheated resid feedstock is then directed to a preheat furnace for final heating to a targeted resid hydroprocessing reaction zone inlet temperature. The feedstock can be contacted with a hydrogen stream prior to, during, and/or after preheating. The hydrogen-containing stream can also be added to the hydrogenation reaction zone of the resid hydroprocess.

The hydrogen stream can be pure hydrogen or can be in admixture with diluents such as low-boiling hydrocarbons, carbon monoxide, carbon dioxide, nitrogen, water, sulfur compounds, and the like. The hydrogen stream purity should be at least about 70 percent by volume hydrogen, preferably at least about 75 percent by volume hydrogen, and more preferably at least about 80 percent by volume hydrogen for best results. Hydrogen can be supplied from a hydrogen plant, a catalytic reforming facility, or other hydrogen-producing or hydrogen-recovery processes known in the art.

The residual feedstock and hydrogen are directed independently or commingled to the resid hydroprocessing reaction zone. The reaction zone generally comprises at least one, preferably at least two, and more preferably three or more parallel reaction trains. A plurality of parallel reactor trains provides the refiner the flexibility of taking one or more trains from service for repairs without having to shut the resid hydroprocessing unit down. Each reactor train generally comprises at least one, preferably at least two, and more preferably three or more reactors in series. Other suitable reactor arrangements can include staging two or more reactors in series with two or more reactors in parallel in a single train. It is intended in the present invention that the reactor staging be customized to facilitate optimum process capability with maintenance and operational flexibility to best suit the refinery operation.

The resid hydroprocess to which the method of the present invention applies, operates with an ebullated bed reaction scheme. An ebullated bed reaction scheme is anticipated for use with the method of the present invention for several reasons. Ebullated bed reactors permit operation at higher average reaction temperatures and allow higher heat release. Ebullated bed reactors also permit the addition and removal of resid hydroprocessing catalyst from the reaction zone without requiring shutdown of reactors or reactor trains. Similarly, ebullated bed reactors also facilitate the processing of heavy residual components which can carry large amounts of solids and tend to form coke under some process conditions. Heavy components that are directed to the ebullated bed or formed under resid hydroprocessing conditions in the reaction zone can be continuously purged from the reaction zone with the turnover of the resid hydroprocessing catalyst. The use of a fixed bed reaction scheme is generally not anticipated for use with the present invention, does not provide the benefits described above, and generally would not be commercially effective.

Similarly, it is the nature of ebullated bed reaction processes that intensify the need for a method and catalyst for reducing catalyst attrition and to which the present method applies. Ebullated bed reaction processes operate by maintaining the solid catalyst particles in random motion by the upward flow of liquid and gas. In this manner, catalyst particles are continuously colliding and are subject to attrition. Similarly, equipment commonly used with ebullated bed reaction systems, such as the ebullated bed pumps, create increased fluid and solids velocities, which, combined with the mechanical nature of the equipment itself, further aggravate catalyst attrition.

The reaction zone operating conditions for conventional resid hydroprocesses generally comprise an average reaction zone temperature of from about 700° F. to about 900° F., preferably from about 750° F. to about 850° F., and more preferably from about 780° F. to about 850° F. for best results. Reaction temperatures below these ranges can result in less effective or less complete hydrogenation. Excessively high temperatures can result in increased catalyst deactivation and higher energy costs.

The reaction zone pressures generally range from about 1000 psig to about 5000 psig, preferably from about 2000 psig to about 4000 psig, and more preferably from about 2500 psig to about 3500 psig for best results. The hydrogen partial pressures are generally maintained at a level above 800 psig, preferably above 1600 psig, and more preferably above 2000 psig for best results. The hydrogen addition rate generally ranges from about 2,000 SCF/Bbl to about 15,000 SCF/Bbl and preferably from about 2,500 SCF/Bbl to about 5,000 SCF/Bbl for best results. Reaction pressures, hydrogen partial pressures, and hydrogen addition rates below these ranges can result in accelerated catalyst deactivation resulting in increased catalyst usage and/or less effective hydrogenation. Excessively high reaction pressures, hydrogen partial pressures, and hydrogen addition rates generally increase energy and equipment costs and provide diminishing marginal benefits.

The reaction zone liquid hourly space velocity (LHSV) generally ranges from about 0.05 $hr^{-1}$ to about 5.0 $hr^{-1}$, preferably from about 0.1 $hr^{-1}$ to about 2.0 $hr^{-1}$, and more preferably from about 0.15 $hr^{-1}$ to about 1.0 $hr^{-1}$ for best results. Excessively high space velocities can result in reduced overall hydrogenation.

The residual feedstock and the hydrogen-containing stream are generally directed into the bottom of the ebullated bed reactor wherein the feedstock and hydrogen flow upwardly through a distributor plate into the reactor bed of resid hydroprocessing catalyst. The bubbling action of the hydrogen-containing stream results in liquid turbulence in the catalyst bed which enhances catalyst, oil, and hydrogen mixing. A vertical downcomer conduit with an open ended upper top and a bottom in communication with the suction of an ebullated bed recycle pump, is provided in the center of the ebullated bed reactor.

As hydrocarbon proceeds upwardly through the ebullated bed reactor, upon reaching the elevation of the open end of the vertical downcomer conduit, some of the stream enters the conduit, flows downwardly through the conduit into the ebullated bed pump, and is recycled back through the distributor plate into the ebullated bed reactor. In this manner, liquid superficial velocities can be maintained so as to expand the ebullated bed and increase or maintain catalyst, oil, and hydrogen contact and reduce temperature gradients in the bed. A conventional ebullated bed generally has a gross volume of at least 10 percent greater and up to 70 percent greater than the solids occupy in a settled state. The required ebullation of the catalyst particles is maintained by introducing the liquid feed, inclusive of recycle, if any, to the reaction zone at a rate suitable for maintaining linear or superficial velocities ranging from about 0.02 to about 0.4 feet per second and preferably, from about 0.05 to about 0.20 feet per second.

The fresh or equilibrium makeup resid hydroprocessing catalyst is generally added to the top of the ebullated bed reactor while spent catalyst is removed from the bottom. It is anticipated that roughly about 1.0 weight percent of the resid hydroprocessing catalyst inventory is replaced each day with fresh catalyst to maintain activity in an ebullated bed reaction system. Thus, the overall system activity is the weighted average activity of catalyst varying from fresh to substantially deactivated catalyst.

The upgraded effluent product from the ebullated reactors is then generally directed to a series of single stage flash and multistage fractionation steps for the separation of a recycle hydrogen stream for redirecting back to the process and for the fractionation of the product streams into boiling ranges that are suitable for downstream processing steps. Typically, the ebullating bed effluent is directed to at least one flash separation step for removing hydrogen from the effluent products. The hydrogen separation is not particularly difficult and can be performed, at the proper temperatures and pressures, with a single stage flash separator without complex fractionating vessel internals. The hydrogen that is removed overhead the flash drums during the flash separation stages is generally processed through an amine contactor or absorber for the removal of hydrogen sulfide from the hydrogen-containing stream. After removal and hydrogen-sulfide adsorption of the hydrogen-containing stream, a portion of the hydrogen-containing stream can be compressed in a recycle gas compressor and directed back into the process. A portion of the hydrogen-containing stream is generally purged to an internal refinery fuel system for maintaining hydrogen purity.

The hydrocarbon product which remains after flash separation of the hydrogen from the upgraded effluent product is generally directed to downstream fractionation steps for providing products specifically tailored for downstream refining processes. The hydrocarbon stream is typically directed to an atmospheric fractionation step for fractionating the stream into streams such as light naphtha, consisting essentially of hydrocarbon comprising a substantial portion of hydrocarbon having 6 carbon atoms or less; heavy naphtha consisting essentially of hydrocarbon having between 7 and 12 carbon atoms; distillate, consisting essentially of hydrocarbon boiling at a temperature ranging from about 150° F. to about 700° F. at atmospheric pressure; light gas oil, consisting essentially of hydrocarbon boiling at a temperature ranging from about 400° F. to about 800° F. at atmospheric pressure; and an atmospheric bottoms product that generally comprises hydrocarbon boiling at a temperature ranging from about 600° F. to about 1200° F.

The atmospheric bottoms product can then be directed to a vacuum resid furnace for preheating the atmospheric bottoms product for subsequent fractionation in a resid hydroprocessing unit vacuum tower. The vacuum distillation step is generally conducted at subatmospheric pressures so as to provide fractionation without having to exceed fractionation temperatures that can accelerate the formation of coke in piping and associated equipment. The vacuum tower generally separates the hydrocarbon into fractions such as vacuum naphtha consisting essentially of hydrocarbon having between 4 and 12 carbon atoms, light vacuum gas oil consisting essentially of hydrocarbon boiling at a temperature ranging from about 400° F. to about 800° F. at atmospheric pressure, heavy vacuum gas oil consisting essentially of hydrocarbon boiling at a temperature ranging from about 400° F. to about 1100° F. at atmospheric pressure, and hydroprocessed vacuum resid generally boiling at a temperature of greater than about 800° F. at atmospheric pressure.

Generally, resid hydroprocessing processes contemplated for use in accordance with the present invention, convert at least 20 weight percent of the feed fraction boiling at a temperature above 1000° F. at atmospheric pressure to hydrocarbon product boiling at a temperature below 1000° F. at atmospheric pressure, preferably above 40 weight percent, and more preferably above 60 weight percent for best results.

When the resid hydroprocessing catalyst is contacted with the resid feedstock under the process conditions and with the processing steps described hereabove, metal deposition and coke formation will generally occur. The metals of particular concern are generally nickel, vanadium, and iron, and shall generally be referred to as the "contaminant metals." A contaminant metal-containing catalyst, for purpose of the present invention, shall be defined as a catalyst having a total contaminant metals accumulation of at least about 4 weight percent nickel and vanadium based on the fresh catalyst weight. A coke-deactivated catalyst, for purpose of the present invention, shall be defined as a catalyst having a carbon concentration ranging from about 10 to about 60 weight percent based on the total fresh catalyst weight. The relative amounts of metals and coke present in the coke-deactivated catalyst can often be dependent upon the relative upstream or downstream position of the catalyst in the reactor while it is in use, among other process and mechanical variables. Catalyst from the upstream reactors often contain higher metals levels than catalyst from the downstream reactors while the downstream reactors often contain higher concentrations of coke.

The regeneration method of the present invention broadly requires contacting the coke-deactivated, contaminant metal-containing resid hydroprocessing catalyst with an oxygen-containing gas at conditions sufficient to remove a substantial amount of the coke.

The oxygen-containing gas generally comprises air but can be supplemented with pure oxygen or a gas having a higher or lower concentration of oxygen which can alter the overall concentration of oxygen in the oxygen-containing gas. For example, a portion of the combustion products steam can be recycled back to the oxygen-containing gas. As such, the oxygen-containing gas generally comprises from about 1 weight percent to about 50 weight percent oxygen, but most commonly ranges from about 10 to about 30 weight percent oxygen.

for purposes of the present invention, a substantial amount of coke is defined as greater than 75 weight percent. However, the method of the present invention generally removes an amount greater than 75 weight percent, preferably greater than 85 weight percent, and more preferably greater than 95 weight percent for best results. The coke-removal step generally renders the catalyst essentially coke-free which shall mean containing less than about 0.3 weight percent coke. However, the method of the present invention generally results in a regenerated resid hydroprocessing catalyst containing less than about 0.15 weight percent coke and commonly less than 0.10 weight percent coke.

Conditions suitable for removing a substantial amount of the coke generally include oxidation temperatures ranging from about 400° F. to about 1500° F. for periods ranging from about 1 to about 12 hours and commonly longer.

The preferred method of regeneration separates the regeneration method into two or more regeneration stages or steps. The two-step process, utilized with the resid hydroprocessing catalyst of the present invention, provides a substantial improvement in regenerated resid hydroprocessing catalyst attrition resistance compared to comparison catalysts processed through single and multiple step regeneration methods.

Where the regeneration method utilizes two steps, the first step is provided to partially decoke the coke-deactivated, contaminant metal-containing catalyst with an oxygen-containing gas at a first temperature for a first period of time sufficient to remove a portion of the deposited carbonaceous material. The preferred temperature for this first step ranges from about 400° F. to about 700° F. and more preferably from about 500° F. to about 680° F. for best results. Under the first step described hereabove, generally 70 weight percent or more of the deposited carbonaceous materials are removed from the coke-deactivated, contaminant metal-containing catalyst.

The second step is provided to perform final decoking or oxidation. The once-oxidized resid hydroprocessing catalyst is then contacted with an oxygen-containing gas at a second, higher temperature ranging from about 800° F. to about 1400° F., preferably from about 800° F. to about 1200° F. and more preferably from about 800° F. to about 1000° F. for best results. This step is generally carried out until about 95 wt % or more of the coke originally deposited is removed.

There is no incorporation, nor contemplated any incorporation of Group IIA metals on the resid hydroprocessing catalyst between oxidation steps. Or, in other terms, the Group IIA metal is incorporated onto the surface of the resid hydroprocessing catalyst prior to the deposition of contaminant metals and coke and onto a catalyst that is essentially coke-free and contaminant metal-free. Coke-free, for purposes of the present invention, is defined as having a carbon content of less than 0.1 weight percent of the fresh catalyst. Contaminant metal-free, for purposes of the present invention, is defined as having a nickel and vanadium content of less than 0.1 weight percent of the fresh catalyst.

The two-step regeneration is particularly preferred and results in a regenerated catalyst having superior attrition properties.

While not wishing to be bound to any particular theory, it is believed that the degradation of attrition resistance during oxidation regeneration is caused initially from the oxidation of vanadium sulfide, $V_3S_4$, the predominant vanadium phase deposited under typical hydrotreating conditions. The $V_3S_4$ sulfide is generally oxidized to vanadium pentoxide ($V_2O_5$), a highly oxidative catalyst, during the combustion step which is highly detrimental to resid hydroprocessing catalyst attrition properties for at least two separate and distinct reaction mechanisms.

First, the water formed during the oxidation of vanadium sulfide to vanadium pentoxide reacts with the vanadium pentoxide to form vanadic acid, $VO(OH)_3$, a volatile and highly reactive species that reacts with metals present in the catalyst such as iron, nickel, aluminum or molybdenum to form mixed metal vanadates. These mixed metal vanadates generally cause loss of both catalyst surface area and attrition resistance.

Secondly, the vanadium pentoxide also catalyzes the conversion of sulfur dioxide formed during the combustion reaction to reactive sulfur trioxide, an acidic gas. The sulfur trioxide generally reacts with alumina supports, resulting in loss of both surface area and attrition resistance.

The two-step process of the present inventive method substantially reduces attrition degradation by providing an initial lower temperature, partial oxidation step that achieves partial decoking while substantially controlling and reducing the amount of vanadium sulfide oxidized to the highly reactive and detrimental vanadium pentoxide.

The two-step method is particularly useful when combined with the resid hydroprocessing catalyst of the present invention since some vanadium sulfide may still oxidize to the reactive vanadium pentoxide and thereby catalyze sulfur dioxide to sulfur trioxide. The Group IIA metal of the resid hydroprocessing catalyst of the present invention, preferentially reacts with the acidic sulfur trioxide since the Group IIA metal is often and generally the most basic component of the spent catalyst (generally more basic than the inorganic oxide support). The reaction of the Group IIA metal with the sulfur trioxide generally forms a well-dispersed overlayer of a Group IIA metal sulfate. This Group IIA metal sulfate overlayer generally minimizes a number of metal-metal interactions (particularly iron oxide-vanadium oxide formation) that are harmful to the catalyst attrition resistance and surface area. Similarly, the Group IIA metal sulfate overlayer also appears to act as a buffer by minimizing alumina dehydroxylation (and surface area loss) caused by any migrating vanadium pentoxide during oxidation at the higher temperatures of the second step.

The upper temperature limits of the second step of the two-step process also facilitate improved regenerated resid hydroprocessing catalyst attrition resistance. It has been found that any vanadium pentoxide that is formed during the partial oxidation first step can melt or otherwise become migratory once temperatures begin to exceed 1000° F., can become generally migratory above 1200° F., and is particularly migratory above temperatures of 1400° F. The more that vanadium pentoxide is dispersed, the greater the potential for catalyzing undesirable reactions. Therefore, it is preferred that the second step oxidation temperature remain within the second step temperature ranges prescribed.

The method of the present invention provides superior regeneration performance while not substantially breaking down the attrition resistance of the resid hydroprocessing catalyst. It has been found that regeneration of a resid hydroprocessing catalyst in accordance with the method of the present invention provides a regenerated catalyst having a loss on attrition (LOA) below 10 weight percent fines per day, commonly below 5 weight percent fines per day, and often below 3.5 weight percent fines per day, calculated based on a regeneration temperature of about 900° F. Resid hydroprocessing catalysts that are not in accordance with the present invention can often have loss on attrition levels exceeding 10 weight percent fines per day calculated based on a regeneration temperature of about 900° F.

It is anticipated that there may become an abundance of regenerated resid hydroprocessing catalyst that has been prepared in accordance with the present invention in view of the increasingly heavy petroleum crudes processed, tightening petroleum coke markets, and the increasing attractiveness of resid hydroprocessing facilities in accordance with the present invention. As these scenarios appear, other uses for the regenerated resid hydroprocessing catalyst may emerge. For example, it is anticipated that the regenerated catalyst of the present invention will have utility for use in providing or supplementing cracking activity in a hydrocracking process, as a guard bed for a distillate, gas oil, or residual hydrotreating processes, or as fluidized solids for use with fluidized commercial processes such as a fluidized coking process or fluidized resid demetallation process.

The present invention is described in further detail in connection with the following examples, it being understood that the same are for the purpose of illustration and not limitation.

EXAMPLES

The following Examples illustrate various improvements afforded by the process of the present invention.

Example 1 is provided to illustrate the effects of Group IIA metals such as magnesium on the activities of fresh Co-Mo catalysts. In Example 1, the desulfurization, ramscarbon, denitrogenation, and devanadization activities versus nickel and vanadium accumulation on a magnesium-treated, fresh catalyst is compared with the same activities for a nonmagnesium-treated, fresh catalyst (See FIGS. 1-4).

Example 2 is provided to illustrate the effects of a Group IIA metal such as magnesium on attrition resistance. In Example 2, magnesium was incorporated onto a fresh catalyst which was contacted with a heavy hydrocarbon feed, decoked, and tested for attrition resistance. The decoked magnesium-treated catalyst's attrition resistance was compared to the attrition resistance of a fresh, nonmagnesium-treated catalyst and a decoked, nonmagnesium-treated catalyst.

The chemical properties of catalysts tested in Examples 1 and 2 are provided in Table 1. The compositions of catalysts B, C, E, and F were normalized to a fresh catalyst basis using an aluminum tie-point method based on the alumina content of Catalyst A. The analytically determined value was converted to a fresh catalyst basis by multiplying by the ratio of the Al (fresh basis)/Al (spent basis).

TABLE I

| Chemical Analyses (wt %) | Catalyst A Non-Mg Fresh Catalyst | Catalyst B Non-Mg Spent Catalyst | Catalyst C Non-Mg Decoked Catalyst |
|---|---|---|---|
| Ni | — | 4.76 | 4.56 |
| V | — | 12.4 | 12.7 |
| Fe | — | 1.43 | 1.25 |
| Na$_2$O | — | — | — |
| SiO$_2$ | — | — | — |
| CoO | 3.55 | 3.69 | 3.77 |
| MoO$_3$ | 13.86 | 13.4 | 13.1 |
| MgO | — | — | — |
| C | — | 89.3 | — |
| H | — | 5.81 | — |
| S | 0.08 | 20.2 | — |
| Al (Fresh Basis) | 43.6 | 43.6 | 43.6 |
| Al (Spent Basis) | — | 16.2 | 24.4 |

| Chemical Analyses (wt %, Fresh Basis, Al-Tie) | Catalyst D Mg Fresh | Catalyst E Mg Spent | Catalyst F Mg + Decoked 900° F. Invention |
|---|---|---|---|
| Ni | — | 1.74 | 1.74 |
| V | — | 9.48 | 9.48 |
| Fe | — | — | — |
| Na$_2$O | — | — | — |
| SiO$_2$ | — | — | — |
| CoO | 3.30 | 3.30 | 3.30 |
| MoO$_3$ | 14.4 | 14.4 | 14.4 |
| MgO | 1.45 | 1.45 | 1.45 |
| C | — | — | 0 |
| H | — | — | 0 |
| S | — | — | — |
| Al (Fresh Basis) | 43.6 | 43.6 | 43.6 |
| Al (Spent Basis) | — | 26.2 | 26.2 |

Catalyst A was a fresh, commercially available, Co-Mo, bimodal, 1/25-inch extrudate having a surface area of 287 m$^2$/g, (as determined by BET analysis). Catalyst A served as a non-magnesium-treated fresh control catalyst.

Catalyst B was a spent, commercially available, Co-Mo, bimodal 1/25 inch extrudate having a catalytic metals content similar to that of Catalyst A. Catalyst B was removed from a commercial resid hydroprocessing unit after accumulating a contaminant metals concentration of 17.1 wt % nickel plus vanadium. Prior to analysis, Catalyst B was washed with toluene and hexane to strip off excess oil and dried overnight in a nitrogen-purged convection oven at a temperature of 250° F. Catalyst B served as a non-magnesium intermediate (or spent) catalyst.

Catalyst C was obtained from decoking the catalyst of Catalyst B. Catalyst B was subjected to a single coke-burning step at 900° F. for 2 hours. The coke-burning step was initiated at 300° F. and increased at increments of about 100° F. per hour until a temperature of about 900° F. was reached. The decoking temperature of 900° F. was maintained for a period of 2 hours. Catalyst C served as a decoked non-magnesium intermediate catalyst.

Catalyst D was obtained by impregnating the non-magnesium-treated catalyst of Catalyst A with magnesium. Catalyst D was prepared by impregnating Catalyst A with an aqueous solution of magnesium nitrate hexahydrate to provide a magnesium loading of 1.45 wt % magnesium oxide based on the total fresh catalyst weight. The catalyst was subsequently dried at a temperature of 250° F. overnight in an air-purged convection oven and calcined for 2 hours at 1000° F. The calcining temperature was attained by increasing the temperature of the oven at increments of about 3.3° F./min from the drying temperature of 250° F. to the calcining temperature of 1000° F. Catalyst D served as a fresh, magnesium-treated catalyst.

Catalyst E was obtained by equilibrating the fresh, magnesium-treated catalyst of Catalyst D in a pilot plant hydrotreating unit. Catalyst E was prepared by taking 100 cc of Catalyst D and loading it into a fixed-bed upflow reactor (⅝ inch I.D.). Resid feeds A and B, described in Table II, were passed through the reactor at the process conditions shown in Table III. As illustrated in Table I, about 11.2 weight percent nickel plus vanadium accumulated on Catalyst E over the course of the run. Catalyst E served as a magnesium-treated intermediate (or spent) catalyst.

TABLE II

| Feed Inspection | | |
|---|---|---|
| Total Liquid | A | B |
| Gravity, °API | 6.9 | 7.3 |
| 1,000° F. + wt % | 85.7 | 71.2 |
| Ni, ppm | 68 | 112 |
| V, ppm | 288 | 450 |
| Fe, ppm | 20 | 15 |
| S, wt % | 4.8 | 3.75 |
| N, wt % | 0.5 | 0.62 |
| Ramscarbon, wt % | 19.9 | 71.2 |
| 1,000° F. + | | |
| Oils, wt % | 21.4 | — |
| Resins, wt % | 62.8 | — |
| Asphaltenes, wt % | 14.8 | — |

TABLE III

| Run Summary for Catalyst E | | | | | | |
|---|---|---|---|---|---|---|
| Day | Feed | Feed Ni + V (PPM) | Product Ni + V (PPM) | T (°F.) | P (PSIG) | LHSV (hr$^{-1}$) |
| 1 | A | 356 | — | 780 | 2000 | 0.20 |
| 2 | A | 356 | 2 | 780 | 2000 | 0.20 |

TABLE III-continued

| Run Summary for Catalyst E | | | | | | |
|---|---|---|---|---|---|---|
| Day | Feed | Feed Ni + V (PPM) | Product Ni + V (PPM) | T (°F.) | P (PSIG) | LHSV (hr$^{-1}$) |
| 3 | A | 356 | 3 | 780 | 2000 | 0.20 |
| 4 | A | 356 | 2 | 780 | 2000 | 0.20 |
| 5 | A | 356 | 4 | 780 | 2000 | 0.20 |
| 6 | A | 356 | 3 | 780 | 2000 | 0.20 |
| 7 | A | 356 | 5 | 780 | 2000 | 0.20 |
| 8 | A | 356 | 5 | 780 | 2000 | 0.20 |
| 9 | B | 562 | — | 755 | 2000 | 1.0 |
| 11 | B | 562 | 135 | 755 | 2000 | 1.0 |
| 13 | B | 562 | 163 | 755 | 2000 | 1.0 |
| 15 | B | 562 | 164 | 755 | 2000 | 1.0 |
| 21 | B | 562 | 129 | 755 | 2000 | 1.0 |

Catalyst F was prepared by decoking the catalyst of Catalyst E. Catalyst E was deoiled using a toluene and hexane wash and dried overnight in a nitrogen-purged convection oven at a temperature of about 250° F. The coke-burning step was initiated at 300° F. and increased at increments of about 100° F. per hour until a temperature of about 900° F. was reached. The decoking temperature of 900° F. was maintained for a period of 2 hours. Catalyst F served as the decoked, magnesium-treated catalyst in accordance with the present invention.

EXAMPLE 1

Catalyst A (fresh non-magnesium catalyst) was tested for desulfurization, ramscarbon removal, denitrogenation and devanadation activity and compared to Catalyst D (fresh magnesium-treated catalyst) which was also tested for the same activities. The results are shown in FIGS. 1–4 which depict desulfurization, ramscarbon removal, denitrogenation, and devanadation activity, respectively, versus weight percentage accumulation of nickel plus vanadium on each catalyst.

Desulfurization activity assuming pseudo-second order with an activation energy of 83,300 Btu/lb-mole, was calculated in accordance with the following equation:

$$A_S = \frac{\left[\frac{1}{S_P \times .93} - \frac{1}{S_F}\right] \times LHSV}{k_S \times P \times e^{-E/RT}}$$

where:

$A_S$ is desulfurization activity $K_S$ is pre-exponential feed sulfur factor ($1420 \times 10^6$ hr$^{-1}$ psig$^{-1}$/wt %)

$S_P$ is product sulfur content, wt %

P is total pressure, psig $S_F$ is feed sulfur content, wt %

T is absolute average temperature, °R

E is activation energy, 83,300 Btu/lb-mol

LHSV is liquid (volumetric) hourly space velocity, hr$^{-1}$.

Ramscarbon removal activity, assuming pseudo-second order kinetics with an activation energy of 83,300 BTU/lb-mole, was calculated in accordance with the following equation:

$$A_r = \frac{\left[\frac{1}{R_p \times .93} - \frac{1}{R_F}\right] \times LHSV}{k_r \times P \times e^{-E/RT}}$$

where:
$A_r$ is ramscarbon removal activity
$k_r$ is pre-exponential feed Ramscarbon factor ($103 \times 10^6$ hr$^{-1}$ psig$^{-1}$/wt %)
$R_P$ is product ramscarbon content, wt %
$R_F$ is feed ramscarbon content, wt %
P is total pressure, psig
T is absolute average temperature, °R
E is activation energy, 83,300 Btu/lb-mol
LHSV is liquid (volumetric) hourly space velocity, hr$^{-1}$.

Denitrogenation activity was calculated, assuming pseudo-first-order kinetics with an activation energy of 45,400 Btu/lb-mole, in accordance with the following equation:

$$A_N = \frac{-\left[\ln\left[\frac{N_p \times .93}{N_F}\right]\right] \times LHSV}{K_N \times P \times e^{-E/RT}}$$

where:
$A_N$ is HDN activity
$N_F$ is feed nitrogen content, ppm
$N_P$ is product nitrogen content, ppm
LHSV is liquid (volumetric) hourly space velocity, hr$^{-1}$
$K_N$ is pre-exponential feed nitrogen factor = 92 hr$^{-1}$ psig$^{-1}$
P is total pressure, psig
E is activation energy 45,400 Btu/lb-mol
T is absolute average temperature, °R.

Devanadation activity was calculated on the basis of the following first-order rate equation, where the activation energy was 83,300 Btu/lb-mol:

$$A_V = \frac{-\left[\ln\left[\frac{V_p \times .93}{V_F}\right]\right] \times LHSV}{K_V \times P \times e^{-E/RT}}$$

where:
$A_V$ is devanadation activity
$V_P$ is product vanadium content, ppm
$V_F$ is feed vanadium content, ppm
$K_V$ is pre-exponential feed vanadium factor ($2730 \times 10^6$ hr$^{-1}$ psig$^{-1}$)
P is total pressure, psig
T is absolute average temperature, °R
E is activation energy, 83,300 Btu/lb-mol
LHSV is liquid (volumetric) hourly space velocity, hr$^{-1}$.

Figure 1:
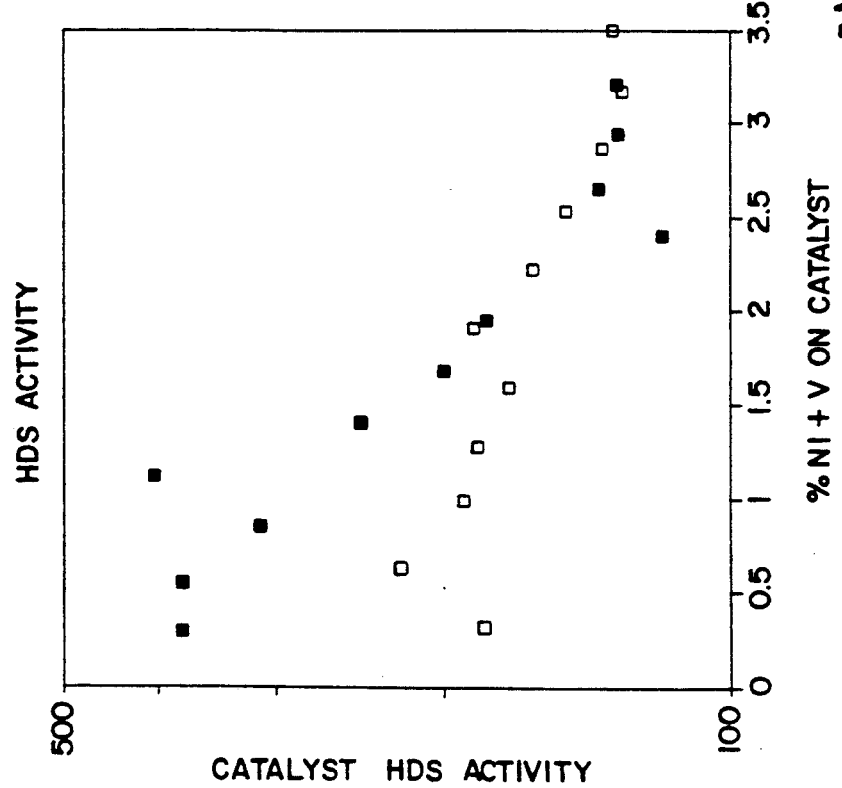
FIG. 1 is a graph illustrating the relationship between desulfurization activity and weight percentage accumulation of nickel plus vanadium for both a nonmagnesium-treated, fresh catalyst and a magnesium-treated fresh catalyst.
Figure 3:
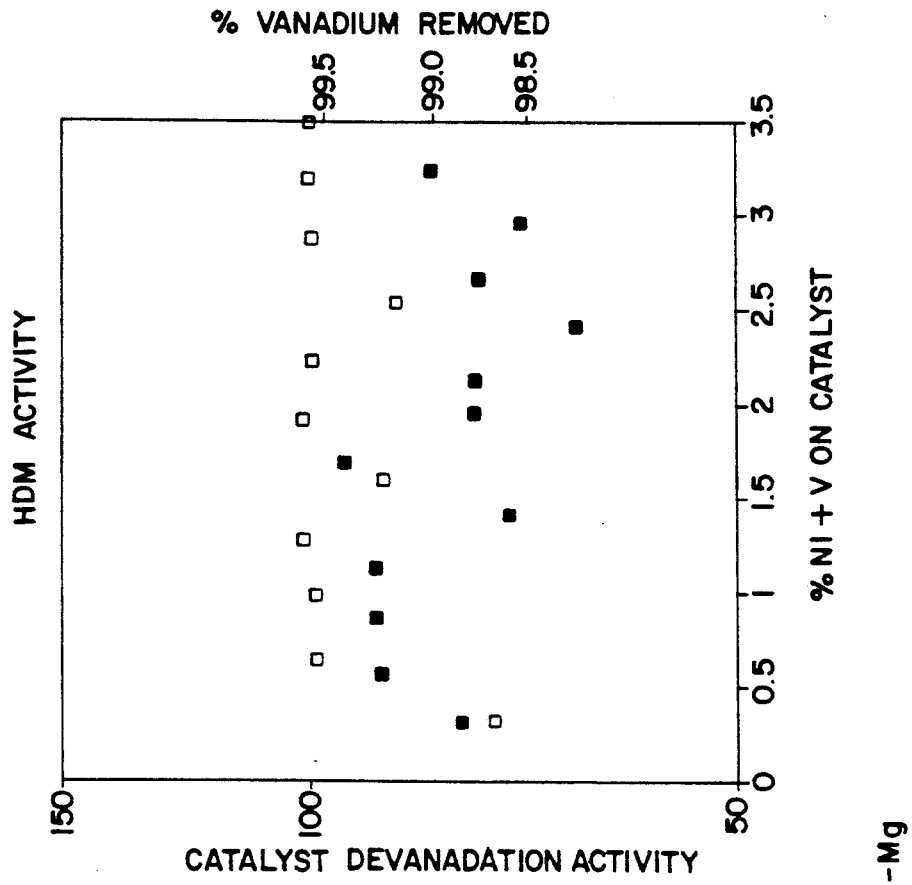
FIG. 3 is a graph illustrating the relationship between denitrogenation activity and weight percentage accumulation of nickel plus vanadium for both a nonmagnesium-treated, fresh catalyst and a magnesium-treated fresh catalyst.
Figure 4:
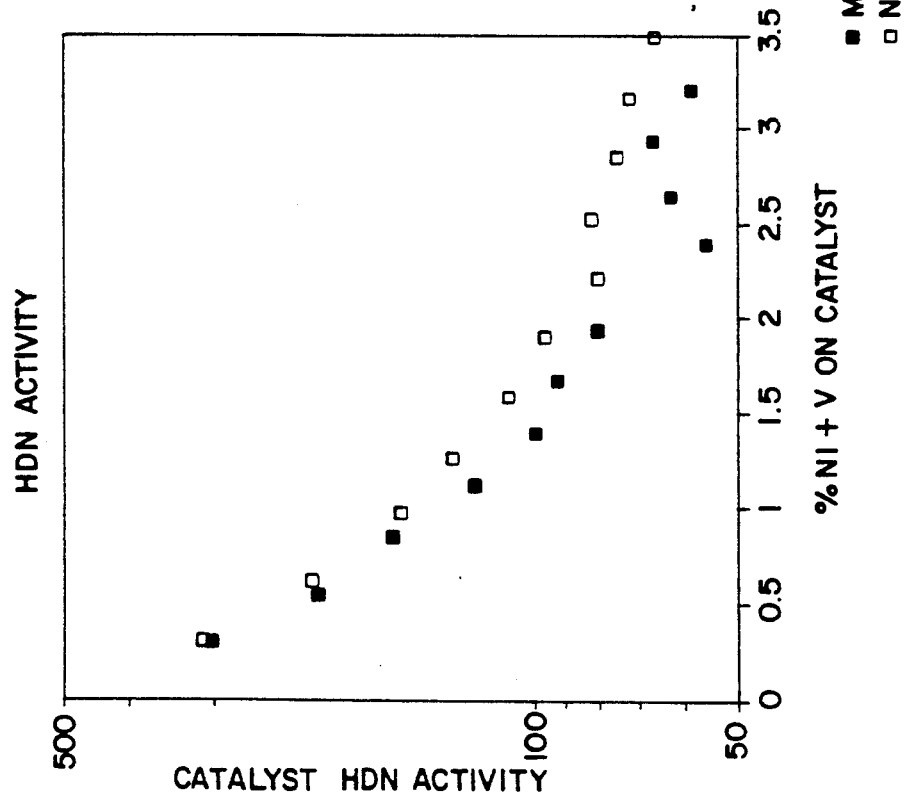
FIG. 4 is a graph illustrating the relationship between devanadation activity and weight percentage accumulation of nickel plus vanadium for both a nonmagnesium-treated, fresh catalyst and a magnesium-treated fresh catalyst.

The Figures reflect that the presence of magnesium oxide on a fresh Catalyst D does not significantly impair its activity compared to the nonmagnesium-treated, fresh Catalyst A. In fact, FIGS. 1 and 2 show that the magnesium-treated catalyst had unexpectedly superior initial activities for desulfurization and ramscarbon removal, respectively, compared to the non-magnesium fresh catalyst. FIGS. 3 and 4 show that the magnesium-treated catalyst has about the same or slightly less activity for nitrogen removal, and slightly less activity for devanadation compared to the non-magnesium-treated catalyst. For devanadation, FIG. 4 shows that the magnesium-treated catalyst removes 98.5 wt % of the feed vanadium compared to 99.5 wt % of the feed vanadium for the control catalyst.

Activity testing was carried out in a fixed-bed upflow reactor a space velocity of 0.2 LHSV, a pressure of 2000 psig, a reactor temperature of 780° F., and a hydrogen addition rate of 10,000 SCFB using Feed A as described in Table II. In each test, 40 cc of the respective Catalysts A and D was diluted with 40 cc of 14/20 mesh alpha-alumina chips and loaded into the reactor.

EXAMPLE 2

Catalysts A, C, and F were analyzed to determine the effects of magnesium treatment on catalyst attrition.

Catalysts A was tested for attrition resistance by passing a 100 g sample of catalyst over a U.S. 30 mesh sieve to remove fines. The sample was then calcined at 1,000° F. for about 1 hour and subsequently cooled to room temperature in a desiccator. The catalyst was weighed and the sample weight, W(b), recorded. The sample was then placed in an abrasion test drum as described in ASTM method D4058 along with about 0.4 grams of activated carbon (added to prevent static build-up). The abrasion test drum was tumbled at 60 rpm for 22 hours. The sample was removed from the drum and passed over a U.S. 30 mesh size screen. Catalyst A was then recalcined at 1,000° F. for 1 hour, cooled to room temperature, and placed in a desiccator. The sample was then reweighed, W(a), and the weight recorded.

The loss on attrition (LOA) was calculated in accordance with the following formula:

$$LOA = \frac{[W(b) - W(a)]}{W(b)} \times 100$$

Decoked catalysts C and F, which contained vanadium and were therefore oxygen sensitive, were tested utilizing the same attrition procedure as described above, except that the catalysts were predried in nitrogen for 1 hour at 900° F. prior to attrition testing and then post-dried in air for 2 hours at 900° F. after the attrition test. The purpose of the lower 900° F. temperature was to prevent further oxidation of the decoked catalyst prior to the attrition test and should not have adversely affected the attrition results relative to the fresh catalyst A.

The attrition data presented for Catalyst A was the average of results obtained on a 100 gram and 60 gram basis. Attrition results were essentially identical within experimental error. Attrition results presented for Catalyst C were on a 100 gram basis while attrition results presented for Catalyst F were on a 60 gram basis.

The results of these tests are provided in Table IV below.

TABLE IV

|  | Fresh Non-Mg Catalyst A | Decoked Non-Mg Catalyst C | Decoked Mg Catalyst F |
|---|---|---|---|
| Dry LOA, wt % Fines/Day | 1.49 | 10.01 | 3.27 |

Table IV illustrates that the best attrition performance was achieved by the fresh nonmagnesium catalyst, Catalyst A. Catalyst A had a Loss on Attrition (LOA) of 1.49 weight percent fines/day. The worst attrition performance was achieved by the decoked, nonmagnesium Catalyst C, which had an unacceptably low LOA of 10.01 weight percent fines/day. Catalyst F, which was a decoked magnesium-treated catalyst in accordance with the present invention, achieved a LOA of 3.27 weight percent fines/day.

As such, a resid hydroprocessing catalyst, treated or modified in accordance with the present invention, generally achieves increased attrition resistance and has improved attrition properties generally resulting in a regenerated catalyst with attrition levels of below 10 weight percent fines per day LOA, commonly below 5 weight percent fines per day, and often below 3.5 weight percent fines per day calculated based on a regeneration temperature of about 900° F.

Other embodiments of the invention will be apparent to those skilled in the art from a consideration of this specification or from practice of the invention disclosed herein. It is intended that this specification be considered as exemplary only with the true scope and spirit of the invention being indicated by the following claims.

That which is claimed is:

1. A method for regenerating a molecular sieve-free resid hydroprocessing catalyst for use with an ebullated bed reaction process comprising at least one Group VIB hydrogenation metal, at least one Group VIII hydrogenation metal, and at least one Group IIA metal deposited on an inorganic oxide support wherein said catalyst contains a pore volume of pores having a diameter greater than 1200 Angstroms of at least 0.05 cc/gm, comprising the steps of:

contacting said molecular sieve-free resid hydroprocessing catalyst with a contaminant metal-containing hydrocarbon feedstream in a first contacting step at conditions sufficient to deposit contaminant metals and coke onto said molecular sieve-free resid hydroprocessing catalyst and producing a coke-deactivated, contaminant metal-containing, molecular sieve-free catalyst;

contacting said coke-deactivated, contaminant metal-containing, molecular sieve-free catalyst with an oxygen-containing gas in a second contacting step at oxidation conditions sufficient to remove at least 70 weight percent of said coke from said coke-deactivated, contaminant metal-containing, molecular sieve-free catalyst, wherein said oxidation conditions comprising an oxidation temperature ranging from about 400° F. to about 680° F., and producing a once-oxidized resid hydroprocessing catalyst; and contacting said once-oxidized resid hydroprocessing catalyst with an oxygen-containing gas in a third contacting step at oxidation conditions such that at least 95% of the originally deposited coke is removed from said coke-deactivated, contaminant metal-containing, molecular sieve-free catalyst and producing a regenerated molecular sieve-free resid hydroprocessing catalyst, wherein said oxidation conditions comprise an oxidation temperature ranging from about 800° F. to about 1400° F.;

wherein the loss on attrition of said regenerated molecular sieve-free resid hydroprocessing catalyst after said third contacting step is less than 10 weight percent fines per day calculated based on a regeneration temperature of about 900° F.

2. The method of claim 1 wherein said contaminant metals are at least one member selected from the group consisting of vanadium, nickel, and iron and the combined vanadium and nickel concentration of said coke-deactivated, contaminant metal-containing, molecular sieve-free catalyst is at least about 4 weight percent.

3. The method of claim 1 wherein said Group VIB hydrogenation metal comprises at least one member selected from the group consisting of molybdenum and tungsten, said Group VIII hydrogenation metal is at least one member selected from the group consisting of cobalt and nickel, and said Group IIA metal is magnesium.

4. The method of claim 1 wherein said Group VIB and Group VIII hydrogenation metals are incorporated onto said catalyst after incorporating said Group IIA metal.

5. The method of claim 1 wherein the carbon content of said molecular sieve-free resid hydroprocessing catalyst at the time of Group IIA metal incorporation is less than about 0.1 weight percent based on the weight of the fresh catalyst.

6. The method of claim 1 wherein said second contacting step is conducted at a temperature ranging from about 500° F. to about 680° F. and said third contacting step is conducted at a temperature ranging from about 800° F. to about 1000° F.

* * * * *